United States Patent

Nostrand et al.

[15] 3,680,286
[45] Aug. 1, 1972

[54] AIR CLEANER

[72] Inventors: William G. Nostrand; Clifford G. Nelson, both of Stoughton, Wis.

[73] Assignee: Nefco Filter Corporation, Stoughton, Wis.

[22] Filed: May 26, 1970

[21] Appl. No.: 40,672

[52] U.S. Cl. ..................55/484, 55/382, 55/502, 55/514
[51] Int. Cl. .............................................B01d 50/00
[58] Field of Search........55/337, 382, 383, 384, 502, 55/514, 484

[56] References Cited

UNITED STATES PATENTS 3,350,860  11/1967  Grassel et al.................55/484 X
3,540,190  11/1970  Brink..........................55/484 X Primary Examiner—Robert L. Lindsay, Jr.
Attorney—Darbo, Robertson & Vandenburgh

[57] ABSTRACT

For removing dust from air, a safety filter comprising a working filter unit subassembly and safety filter element are housed within a preferably rectangular shell and combined with a centrifugal precleaner. The working filter unit comprises a plurality of spaced cylindrical filter elements permanently mounted in plastic end plates. Flow is from outside to the inside of the cylindrical elements. Mounting of the precleaner automatically clamps the working filter unit in position and seals the passageway to the safety filter element.

4 Claims, 10 Drawing Figures

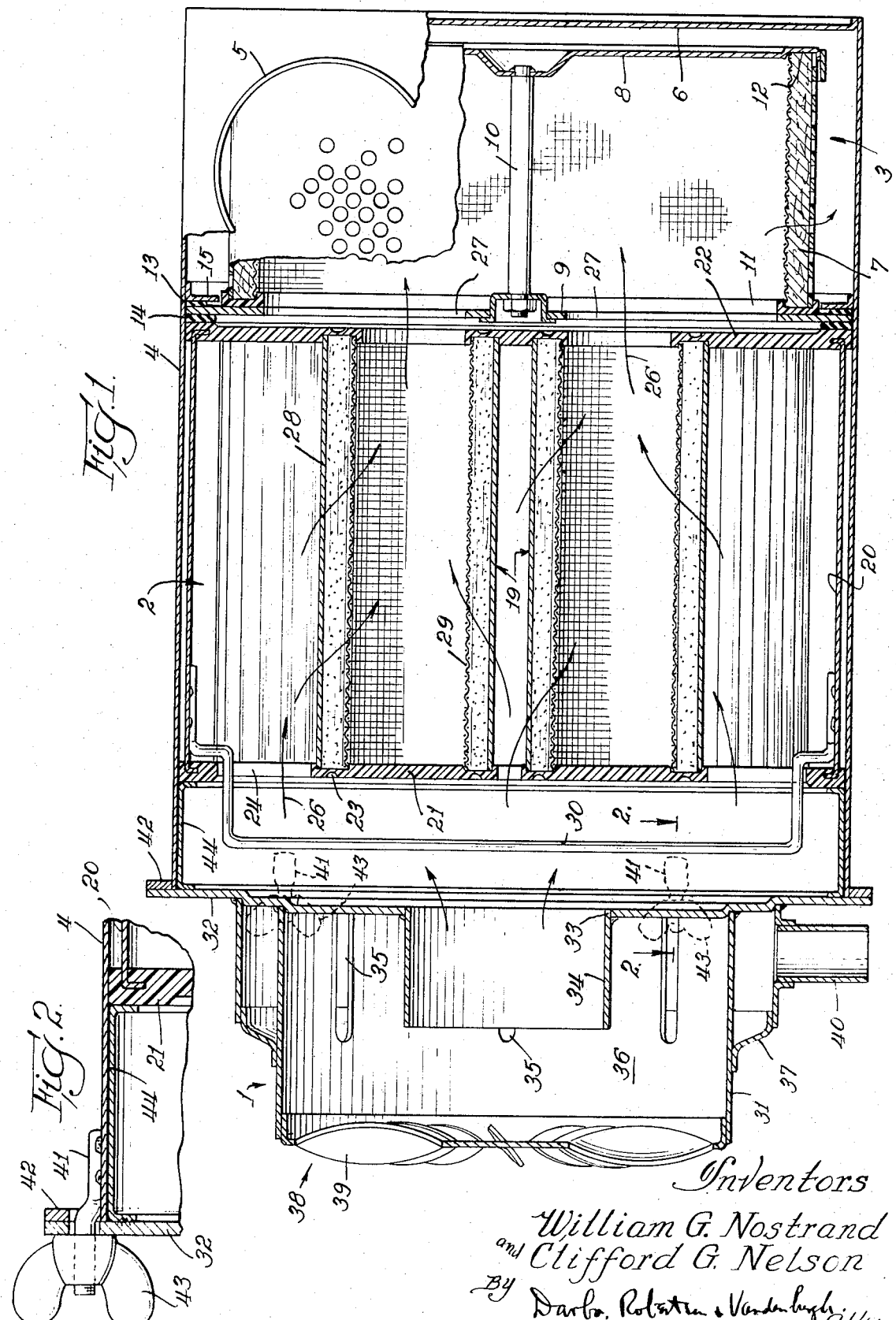

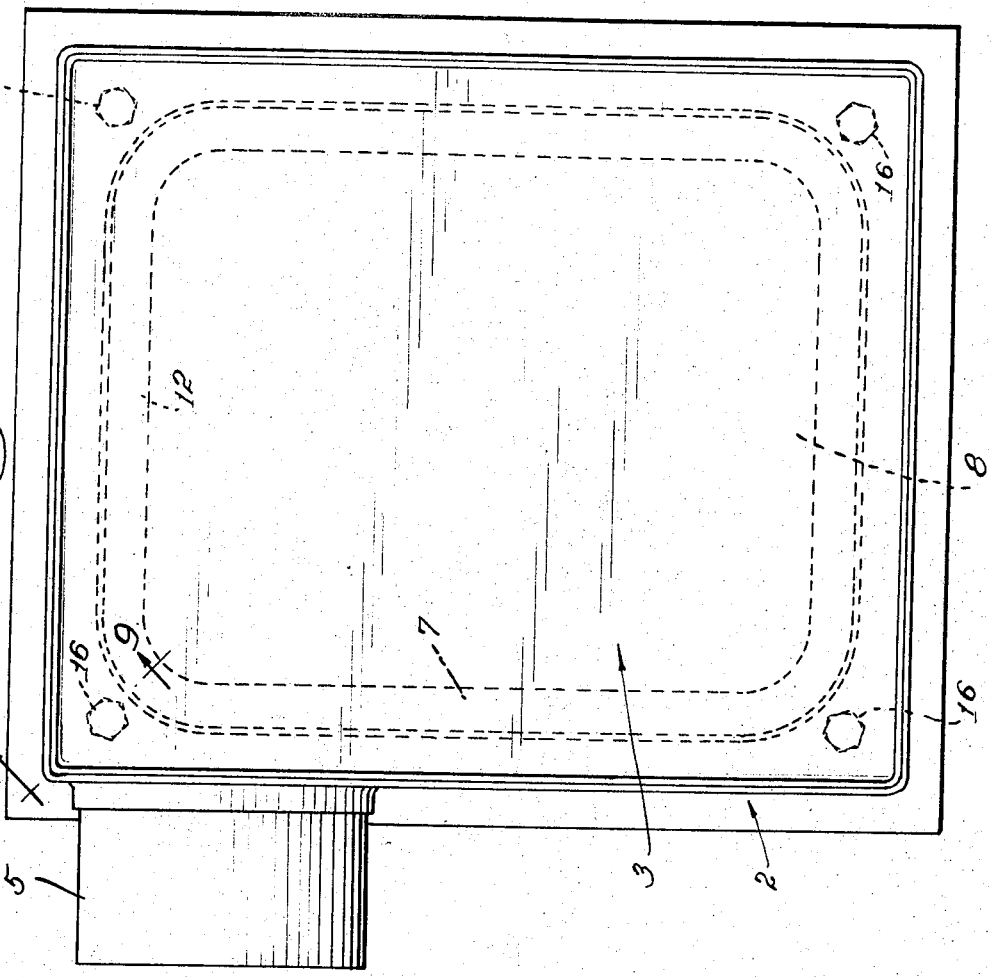
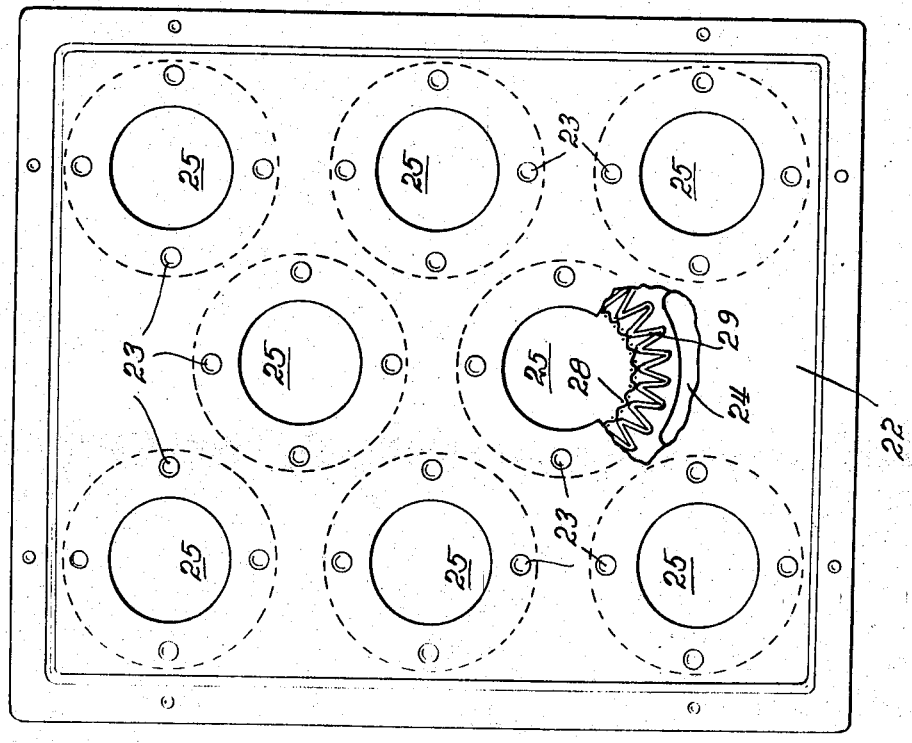

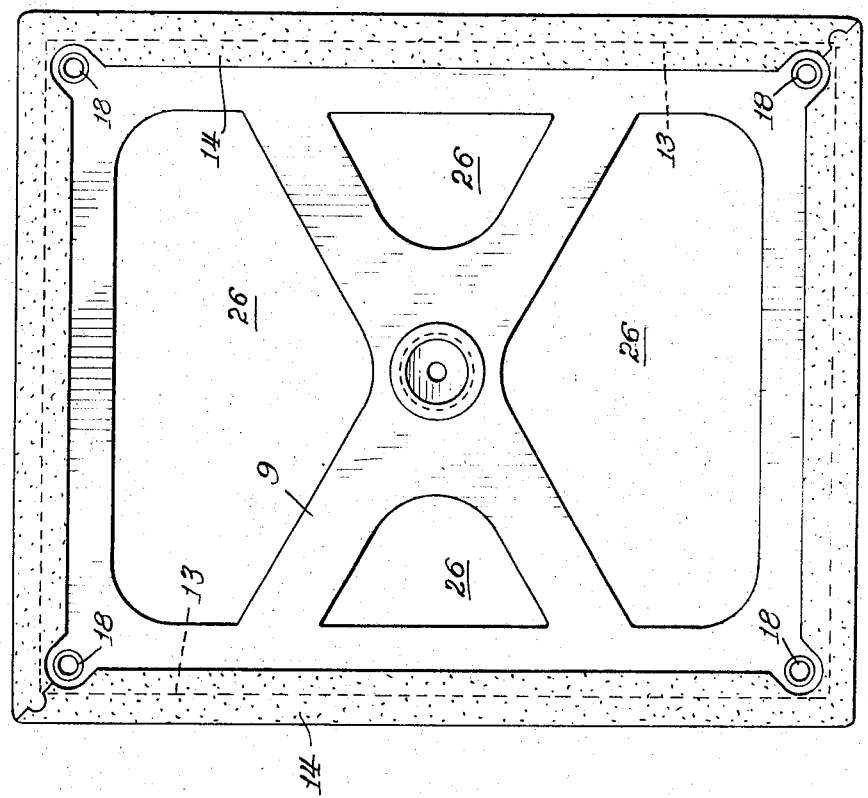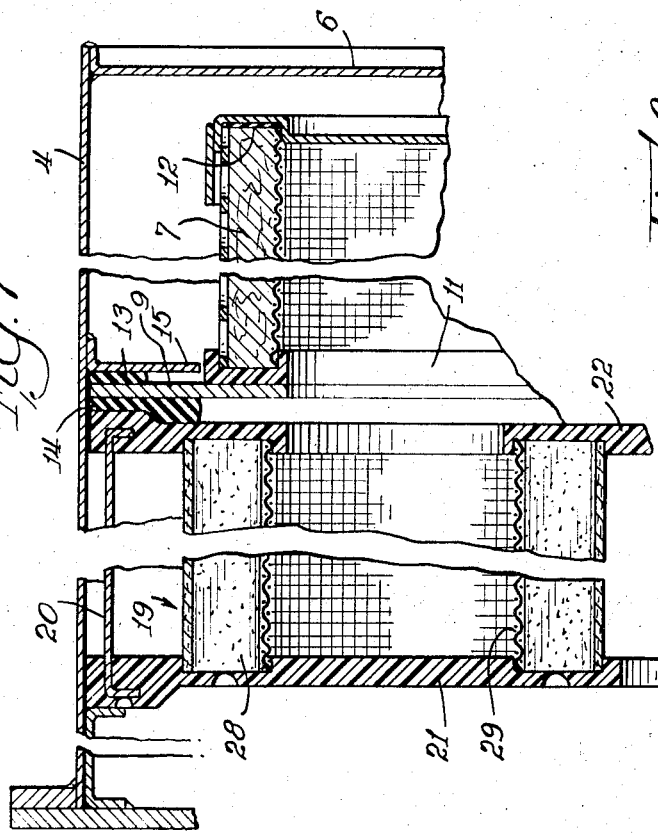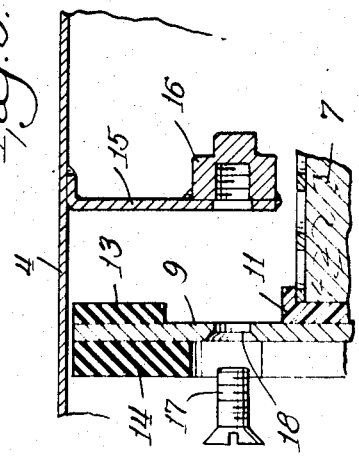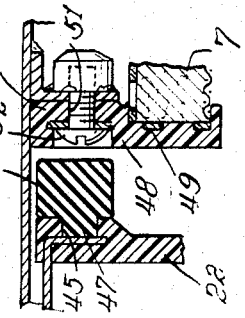

AIR CLEANER

BACKGROUND AND SUMMARY OF THE INVENTION

Filters for such applications as the cleaning of intake air for engines of all kinds, e.g., stationary, tractor, truck, and earth moving equipment, must reliably remove substantially all of the particulate matter with which the ambient air is loaded to protect the engines from excessive wear and damage. At the same time, the filter accomplishing this objective must be small enough to occupy not more than a reasonable allotment of space and maintenance of the filter must be minimized to reduce as far as possible the cost of operating the filter. As is frequently the case, optimum structural and functional characteristics require compromises. For example, reduction in size, without countervailing alterations, usually results in loss of cleaning efficiency of an air filter. The continuing problem is to achieve maximum compactness with minimum maintenance while maintaining, or improving, cleaning efficiency.

The cost of manufacturing the filter equipment is also a very important consideration. It is highly desirable to design structure and employ techniques and materials for economy in manufacture as well as for efficient performance.

The principal object of this invention is to provide a highly efficient air cleaner which is compact and which may be manufactured economically and serviced with a minimum of time and materials. More specifically, the object is to provide an air cleaner having a safety filter element mounted within a shell of preferably rectangular cross section and a working filter unit demountably arranged within the shell with provision for a centrifugal precleaner unit the mounting of which upon the shell clamps the working filter unit in position with establishment of a dependable seal at the entrance to the safety filter. The working life of the working filter unit is greatly increased by the preliminary removal of a substantial portion of the dust by the precleaner. The working filter unit may be constructed by arranging the cylindrical elements, along with supporting structure, in a mold and casting the respective end plates from a suitable plastisol.

BRIEF DESCRIPTION OF THE DRAWING

FIG. 1 is a view, partly in elevation and partly in cross section, of a preferred embodiment of the improved air cleaner of the invention;

FIG. 2 is a detail view taken at the line 20— 2 of FIG. 1;

FIG. 5 is a plan view of the outlet end of the working filter unit partly broken away to show filter element structure;

FIG. 6 is an outlet end view of the air cleaner;

FIG. 7 is a detail view in cross section taken at the line 7 — 7 of FIG. 3;

FIG. 8 is a plan view of the safety filter subassembly;

FIG. 9 is an exploded detail view in cross section taken at the line 9 — 9 of FIG. 6, and FIG. 10 is a detail view in section of a modification.

DESCRIPTION OF A PREFERRED EMBODIMENT

Figure 4:
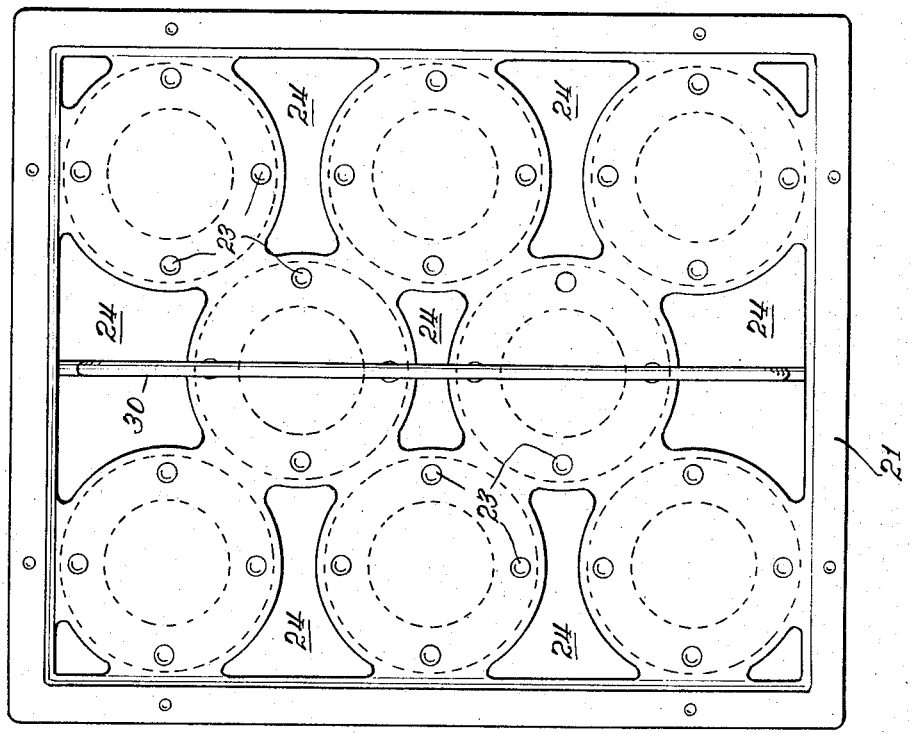
FIG. 4 is a plan view of the inlet end of the working filter unit.

The air cleaner illustrated in the accompanying drawings comprises three functional units; namely, a centrifugal precleaner 1, a working filter unit 2, and a safety filter element 3. The filtering components are housed within a preferably rectangular shell 4 which has an outlet 5 while cylindrical precleaner assembly 1 is mounted upon and closes the inlet end of shell 4. As will be seen as the description of the air cleaner proceeds, the safety filter element subassembly 3 is mounted in the shell independently of the working filter unit 2 and this unit is secured in its proper position within the shell when the precleaner assembly is mounted in position and secured to the shell, access to the working filter unit being obtained by removal of the precleaner assembly.

While shell 4 may be cylindrical, the rectangular form, seen best in FIG. 6, has several advantages the most important of which is compactness in the sense that the smaller dimension of the rectangular cross section of the shell is substantially smaller than the diameter of a comparable cylindrical air cleaner shell so that the device will fit into the limited space available in most applications. The outlet end of the shell is closed by wall 6 while the inlet end is open and entirely unobstructed so that the filter units may be inserted in succession into the shell through the open end. The configurations of the safety and working filter units conform to the preferably rectangular shape of the shell.

The safety filter subassembly (FIGS. 1 and 6 - 9) comprises a rectangular filter element 7 clamped between a cover 8 and spider plate 9 by means of post 10. The ends of the filter element are sealed against the leakage of air past them by means of a suitable gasket 11 and a suitable adhesive material applied to the element-receiving channel 12 of cover 8. Advantageously, gaskets 13 and 14 are cemented to the peripheral portion of spider plate 9 to facilitate the proper positioning of these gaskets in the assembled air cleaner. An internal flange 15 is welded to the wall of shell 4 and is provided with nuts 16 at the four corner locations to receive screws 17 which pass through openings 18 in spider plate 9 to hold the plate securely fastened to flange 15. Gasket 13 is compressed between the periphery of the spider plate and flange 15 as screws 17 are tightened to provide a seal for preventing leakage of air around the edge of the spider plate, bypassing safety filter element 7.

The safety filter subassembly may be taken out of the shell 4 for replacement or cleaning of the filter element as required from time to time by removing screws 17 and then pulling the filter subassembly out through the open end of the shell.

The working filter unit 2 (FIGS. 1 and 4 – 7) comprises a cluster of spaced, parallel cylindrical filter elements 19 surrounded by a wall 20, the whole being mounted between end plates 21 and 22 to form a rigid subassembly unit. Advantageously, although not necessarily, the end plates are formed of a suitable plastic material and may be made in situ by pouring a suitable plastisol into a mold upon which the filter elements and surrounding wall have been arranged so that the bottom ends of the elements and of the wall are embedded in the plastic material after the plastisol has set. This process may be followed to successively provide the two end plates and thereby permanently assemble the several filter elements into a rigid filter unit. Recesses 23 in the end plates indicate the positions of mold spacers which control the depth of immersion of the filter elements 19 and wall 20 into the plastic material. If desired, the plastic end plates may be reinforced by perforated sheet metal laid in the mold before the other components are placed in position for pouring the plastisol.

Inlet end plate 21 is provided with openings 24 which permit and guide the flow of air into the spaces between filter elements 19. Outlet end plate 22 is also provided with openings 25, but these openings communicate with the interiors of the cylindrical filter elements 19. Thus, the path of flow of air through the working filter unit, as indicated by arrows 26, is into the cylindrical filter elements 19 from the space surrounding them and thence through openings 25 of plate 22 and openings 27 provided in the safety filter spider plate 9 to pass through the safety filter and out through the air cleaner outlet 5. The woven wire center tubes 28 easily support the pleated filter media 29 in this inflow direction.

A handle 30 may be riveted or welded to the wall 20 of the working filter unit for the convenient handling of the unit in withdrawing it from, and replacing it in, the air cleaner shell.

The precleaner subassembly 1 comprises a cylindrical wall 31 mounted upon a plate 32, the latter having a central opening 33 from which rises a short, open-ended cylindrical tube 34. A plurality of spaced slots 35 in wall 31 provide for the escape of particulate matter from separating chamber 36 into an annular collecting chamber formed by a circular housing 37. A flow turning vane 38 comprising a series of spaced apart inclined baffles 39 spans the inlet end of cylindrical wall 31 so that air flowing into the cleaner is caused to swirl within chamber 36, resulting in the movement of at least a substantial portion of the denser airborne particles outwardly toward cylindrical wall 31 and out of the air flow stream through slots 35. Suitable means, such as an aspirator, are provided for connection to the dust discharge 40 for the preferably continuous withdrawal of accumulated particulate matter.

Figure 3:
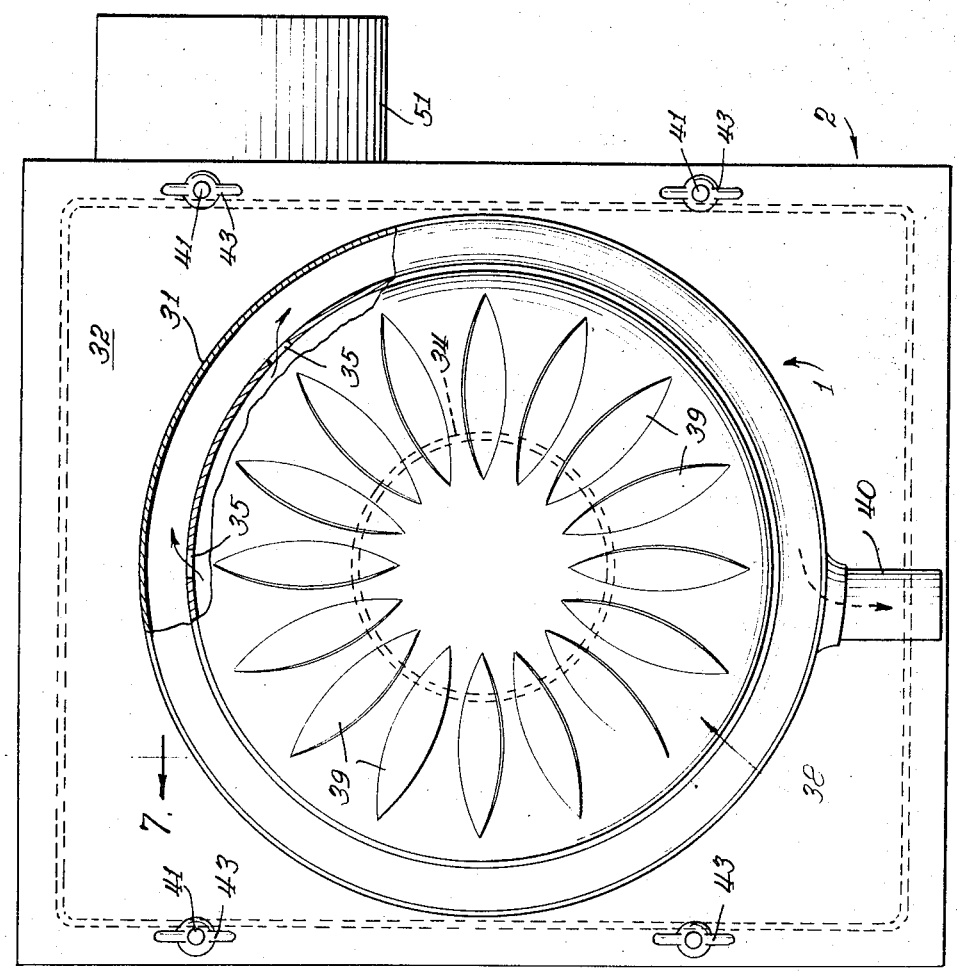
FIG. 3 is an inlet end view partly broken away to show the precleaner structure.

The precleaner assembly is mounted upon air cleaner shell 4 by means of bolts 41, which are welded to the shell and pass through strengthening shell flange 42 and holes in plate 32, and wing nuts 43. As is seen in FIG. 3, plate 32 is rectangular to conform with the shape of shell 4 and a collar 44, the outer surface of which conforms to the inner surface of the side walls of shell 4, is welded to the underside of plate 32. Thus, to mount the precleaner subassembly upon the shell, collar 44 is telescoped into the open top of the shell and plate 32 is moved down over bolts 41. As wing nuts 43 are tightened, collar 44 bears against plate 21 at the location of working filter unit wall 20, pressing the filter unit into the shell to compress gasket 14 between plate 22 and spider plate 9 to seal this connection. This seal is not entirely necessary in view of the seal provided by gasket 13, but it does provide a cushion and additional insurance against the bypassing of air around the safety filter.

It will be understood from the foregoing description that air drawn into the air cleaner will pass first through the precleaner and there be relieved of a very substantial part of its load of dust. The partly cleaned air stream then flows through tube 34 into shell 4, passing through openings 24 and inlet end plate 21 into the space around and between the cylindrical filtering elements 19 of the working filter unit. Substantially all of the remaining dust is removed from the air as it flows through the filter media and into the interiors of the cylindrical elements. It should be noted that there is no need for a seal at the periphery of inlet end plate 21 at, for example, the engaging surfaces of this plate and collar 44, since leakage at this point would constitute the flow of unfiltered air to unfiltered air. The periphery of spider plate 9 must be, and is, doubly sealed so that filtered air passing from the interiors of cylindrical elements 19 through openings 25 in outlet end plate 22 will be required to flow through the safety filter 7. While the latter may comprise media capable of removing the extremely small particles that may have passed through the working filter unit, its principal function is to insure against the accidental passage of particles that could occur if one of the cylindrical elements of the working filter is damaged or if potentially damaging particles are dropped into the shell in the process of changing the working filter unit. Since in normal service, the working filter unit will be replaced or cleaned from four to six times as often as it is necessary to replace or clean the safety filter, the latter is independently mounted in the air cleaner shell and is not disturbed by the removal and replacement of the working filter unit.

The modification shown in FIG. 10 extends the use of plastisol casting to further reduce costs and simplify the structure. A groove 45 is provided in outlet end plate 22 of the working filter and a gasket 46 of sponge rubber or similar material is fastened to this plate by means of boss 47 which is integral with the gasket and fits into the groove. This gasket obviates the need for gasket 14 and as FIG. 10 indicates, makes it possible to use a shallower and therefore stronger flange 15.

FIG. 10 also illustrates the use of a reinforced plastic ring 48 in place of spider plate 9 with resulting cost economies. A reinforcing core 49 of perforated steel is embedded in the body of plastic ring 48 to provide strength and rigidity. In the manner above described, the safety filter element is permanently fastened and sealed to its supporting ring 48 when the plastisol is cast. A gasket portion 50 is also formed in the ring casting and openings 51 provided for the passage therethrough of fastening screws 52. Thus, a separate gasket 13 is avoided.

With this arrangement and structure, post 10 and its supporting structure is eliminated. The safety filter subassembly, usually provided as a throw-away unit, is extremely simple and can be manufactured at minimum cost. The sponge gasket provides a resilient cushion which establishes a dependable seal with greater tolerance of the position of the working filter assembly which provides the sealing pressure.

It will be understood that while employment of the precleaner is usually highly desirable because of the resulting longer useful life of the working filter unit, its use is not indispensable. Ambient air may be drawn directly into the working filter unit of the air cleaner. Also, the safety filter may be omitted if its function is not deemed necessary.

One of the advantages of the air cleaner is its ready adaptability to a range of air flow capacities. Greater or lesser capacity may be provided by the simple expedient of lengthening or shortening the cylindrical filtering elements of the working filter unit with corresponding changes in the dimensions of the unit wall and of the air cleaner shell.

We claim:

1. An air cleaner comprising a shell having one end open and the other end closed except for an air outlet opening, a working filter unit arranged within said shell, said working filter unit comprising a cluster of spaced, parallel generally cylindrical filter elements of equal length, a wall surrounding said cluster in spaced relationship thereto, and an inlet end plate spanning and engaging one end of said cluster and surrounding wall and an outlet end plate spanning and engaging the other end of said cluster and wall, said inlet end plates being composed of plastic material and the respective end portions of said cylindrical filter elements and of said wall surrounding said cluster of filter elements being embedded in the plastic material of said respective end plates, said inlet end plate having openings therein between said filter elements to permit the flow of air into the space around and between said elements, said outlet end plate having openings therein at the ends of said filter elements to permit the flow of air through said plate from the interior of said elements; a safety filter element disposed within said shell at the closed end thereof, means for mounting said safety filter in said shell and channelling the flow of air from said working filter unit to said safety filter element, said means comprising an internal flange fastened to said shell, a spider plate supporting said safety filter element, a gasket sandwiched between the peripheral portion of said spider plate and said flange, and means for pressing said working filter unit against said spider plate whereby to press said plate against said flange to hold plate in position and effect a seal at said gasket, said last mentioned means comprising an end plate spanning the open end of said shell and having an air inlet opening therein, a collar disposed within the open end portion of said shell in telescoping relation therewith, and means for drawing said end plate toward said shell to simultaneously force said collar and thus said working filter unit inwardly and close the open end of said shell.

2. An air cleaner comprising a shell open at its inlet end and closed at its outlet end; said shell having an internal flange spaced from said outlet end and being otherwise free of internal fittings; said shell having an outlet opening between said flange and said outlet end; a spider plate demountably and sealingly fastened to said flange and having air flow openings therein; a safety filter element mounted on the downstream side of said spider plate and interposed between said openings therein and said shell outlet opening; a working filter unit arranged within said shell upstream of and in peripheral contact with said spider plate; said working filter unit comprising a cluster of spaced parallel generally cylindrical filter elements of equal length, a wall surrounding said cluster in spaced relationship thereto, an inlet end plate spanning and sealingly engaging the upstream end of said cluster and surrounding wall and having openings therein communicating with the space around said cylindrical filter elements, an outlet end plate spanning and sealingly engaging the downstream end of said cluster and surrounding wall and having openings therein communicating with the interiors of said cylindrical filter elements; and a precleaner subassembly mounted upon said shell at the open inlet end thereof; said precleaner subassembly including a base plate spanning the open end of said shell and having an air flow opening therein and a collar attached to said base plate and telescopically extending into said shell and engaging the periphery of said inlet end plate; and means for drawing said base plate toward said shell whereby to close said open end of said shell and clamp said working filter unit in position between said collar and said spider plate.

3. An air cleaner in accordance with claim 2 wherein said shell is rectangular in cross section and said working filter unit and said spider plate conforms to the rectangular shape of said shell.

4. An air cleaner in accordance with claim 2 wherein said end plates are composed of plastic material and the respective ends of said cluster of filter elements and said surrounding wall are embedded in the plastic material of said end plates respectively.

* * * * *